United States Patent [19]
Gallo et al.

[11] Patent Number: 5,481,681
[45] Date of Patent: Jan. 2, 1996

[54] DATA TRANSFER OPERATIONS BETWEEN TWO ASYNCHRONOUS BUSES

[75] Inventors: Paul S. Gallo, Watertown; R. W. Benjamin Goodman, Hopkinton; Lawrence L. Krantz, Marlborough; Kathleen A. McLoughlin, Hopkinton; Eric M. Wagner, E. Douglas, all of Mass.

[73] Assignee: Data General Corporation, Westboro, Mass.

[21] Appl. No.: 445,408

[22] Filed: May 19, 1995

Related U.S. Application Data

[63] Continuation of Ser. No. 315,430, Feb. 24, 1989, abandoned.

[51] Int. Cl.$^6$ ........................................... G06F 13/14
[52] U.S. Cl. .................. 395/325; 395/308; 395/280; 364/DIG. 1; 364/240.3
[58] Field of Search ..................... 395/325, 500, 395/550, 725

[56] References Cited

U.S. PATENT DOCUMENTS

| | | | |
|---|---|---|---|
| 3,940,743 | 2/1976 | Fizgerald | 364/200 |
| 4,041,472 | 8/1977 | Shah et al. | 364/900 |
| 4,047,162 | 9/1977 | Dorey et al. | 364/900 |
| 4,396,995 | 8/1983 | Gray | 364/900 |
| 4,716,525 | 12/1987 | Gilanyi et al. | 364/200 |
| 4,896,257 | 1/1990 | Roberts | 364/200 |
| 5,003,463 | 3/1991 | Coyle et al. | 364/200 |

*Primary Examiner*—Thomas G. Black
*Assistant Examiner*—John C. Loomis
*Attorney, Agent, or Firm*—Sewall P. Bronstein; Brian L. Michaelis

[57] ABSTRACT

A technique for permitting data transfers between a high speed bus and a low speed bus which operate independently and asynchronously wherein when the low speed bus requires access to the high speed bus, the busy status of the latter bus is determined and transfers are made to the high speed bus at high speed when such bus is not busy. When the high speed bus requires access to the low speed bus, if the low speed bus is busy the requesting master on the high speed bus is temporarily placed in a pending status and is removed from its tenure on the high speed bus, so that the high speed bus is free to handle other requests. When the low speed bus is free, the highest priority pending requestor is provided access to the low speed bus on a priority basis over all then current requestors.

6 Claims, 7 Drawing Sheets

DATA TRANSFER OPERATIONS BETWEEN TWO ASYNCHRONOUS BUSES

This is a continuation of application Ser. No. 07/315,430 filed on Feb. 24, 1989, now abandoned.

INTRODUCTION

This invention relates generally to data processing systems requiring intercommunication between two buses which operate independently of each other, one of which has a faster operating speed than the other, and, more particularly, to techniques for permitting such intercommunication in a manner which provides the most effective use of such buses so as to minimize bus idle time, particularly for the faster bus.

BACKGROUND OF THE INVENTION

In systems requiring intercommunication between two buses, it has often been common to arrange the buses to operate in synchronism with each other so that intercommunication can take place using control techniques having minimal complexity. In some applications, however, it is desirable, or necessary, that such buses be capable of operating independently of each other so that it is not possible to operate them in a synchronized manner at all times. For example, one bus may be a relatively slow speed bus, while the other bus may operate at a relatively higher speed. In a particular system, for example, the higher speed bus may be a system bus servicing internal devices which are a part of the data processing system and the slower speed bus may be an input/output (I/O) bus servicing external devices peripheral to the data processing system.

In such systems the buses are often arranged to be operated independently of each other, i.e., in an asynchronous manner. In providing intercommunication between them, if one bus requests communication access to the other bus and the other bus is currently busy, the requesting bus operation is normally halted and placed in a wait status until the other bus has terminated its current operation. The requesting bus is thereby placed in an undesired idle state during the required wait time period and cannot be used for any other purpose. Such operation is normally disadvantageous to the overall system performance, particularly when the idled bus is the one having the higher speed of operation.

It is desirable that an effective technique be devised for permitting two buses to operate independently of each other and at different bus operating speeds, while at the same time permitting intercommunication between them, when necessary, by permitting a device on one of the buses to communicate with a device on the other bus in a manner such that the time that the buses, particularly the higher speed bus, remain idle is minimized.

BRIEF SUMMARY OF THE INVENTION

In accordance with the invention, two independently operating buses, one operating at a higher speed than the other, are arranged so that data transfers are made between them via an interface unit in a unique manner depending on the direction of data transfer between them. If the higher speed bus wants to access the slower speed bus, the higher speed bus waits for the slower speed bus to respond and transfer is made at the speed of the slower speed bus. However, if the slower speed bus wants to access the higher speed bus (to send data from or to write data to the higher speed bus) the higher speed bus operates at its faster speed while the slower speed bus operates at its own slower speed. Thus, if access for data transfer is requested from the slower speed bus to the higher speed bus, the data is supplied to and buffered at the interface unit at the speed of operation of the slower speed bus where it can be subsequently transferred to the higher speed bus at the high speed of operation when the higher speed bus is free and made available for such transfer. For a write request, the slower speed bus can be released for other operations once the data is transferred to the interface unit. For a read request, the slower speed bus can be placed in a wait status until the data to be read from the higher speed bus is available for transfer to the lower speed bus.

Further, if monitoring of the activity of the slower speed bus and the destination of the data requested to be transferred by the higher speed bus shows that the lower speed bus is busy and not available at the time the higher speed bus requests such transfer, in accordance with the technique of the invention the higher speed bus temporarily places the requestor in a pended state, thereby suspending the request without suspending the operation of the higher speed bus on which the requestor resides. The higher speed bus is then freed up to be used for servicing requests of other devices thereon, which requests may not require the services of the slower speed bus. When the slower speed bus subsequently becomes available, the requestor which was so pended is then given priority to complete its original pended request operation. Thus, the activity of the higher speed bus need not be halted and placed in a suspended or wait status until the slower speed bus becomes available, but rather the higher speed bus can be used for other activities so that it does not remain in a wait or idle state. Such other activities on the higher speed bus can still be performed independently, i.e., in an asynchronous manner, with respect to the operation of the slower speed bus.

DESCRIPTION OF THE INVENTION

The invention can be described in more detail with the help of the accompanying drawings wherein FIG. 1 shows a block diagram of an exemplary system in which the invention can be used;

Figure 1:
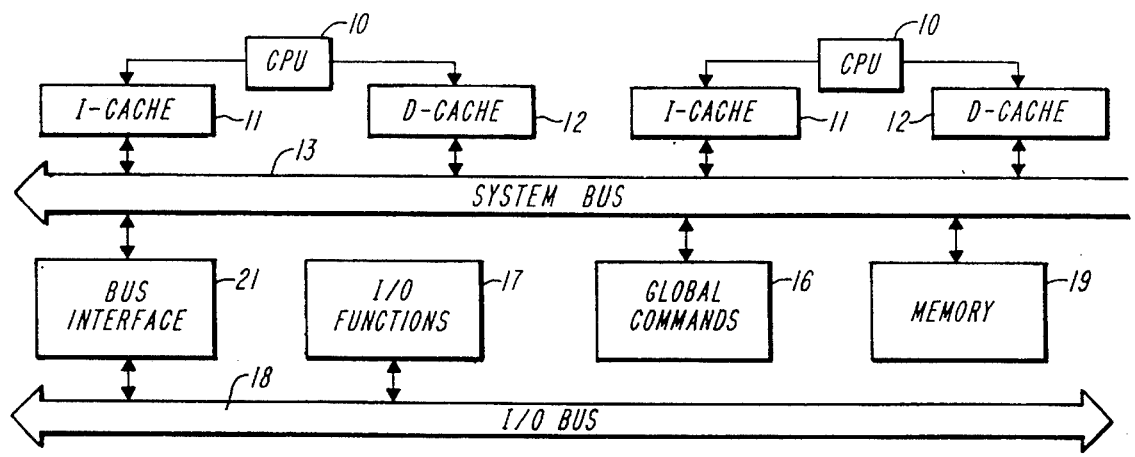

FIG. 1 shows a block diagram of an overall system in which the technique of the invention can be useful. Such system as depicted generally has a relatively known architecture and, in a particular exemplary embodiment shown, comprises one or more central processing units (CPU) 10 each having associated with it appropriate cache memory units such as instruction cache units 11 and data cache units 12, their functions being well known to those in the art.

The processor units communicate with the rest of the overall system via a system bus 13. For example, appropriate global command signals can be supplied via suitable global resource logic 16, such signals including, for example, various globally used clock signals as well as other appropriate command or control signals for use throughout the system. Appropriate I/O function logic 17 may also be available to an I/O bus 18 for handling I/O interrupts and bus arbitration operations, as well as other bus management signals. Data transfers to and from a memory 19 can also be made via the system bus. Units 16, 17 and 19 do not form a part of the invention but are generally of the type available in systems known to the art and need not be described in further detail here.

In addition, information may be required for controlling data transfers to and from I/O devices by way of I/O bus 18 via a suitable interface unit 21. In a particular system, for example, system bus 13 may be a high speed bus while I/O bus 18 may be a slow speed bus and it is desirable that such buses be able to operate asynchronously, i.e., in a time independent manner, with respect to each other. At the same time it is desirable that transfers which are to be made between the buses (which result when devices on one bus require access to devices on the other bus) in a manner such that the higher speed system bus never remains idle and can effectively be utilized substantially at all times even if the data transfer requested cannot be immediately performed.

The invention as described herein is useful in permitting efficient transfers between such faster speed and slower speed buses. While the invention is useful when applied to the system bus and the I/O bus specifically shown in FIG. 1, the invention is described in more general terms below as applicable in any context which requires data transfers between any two asynchronously operating buses having different operating speeds.

Figure 2:
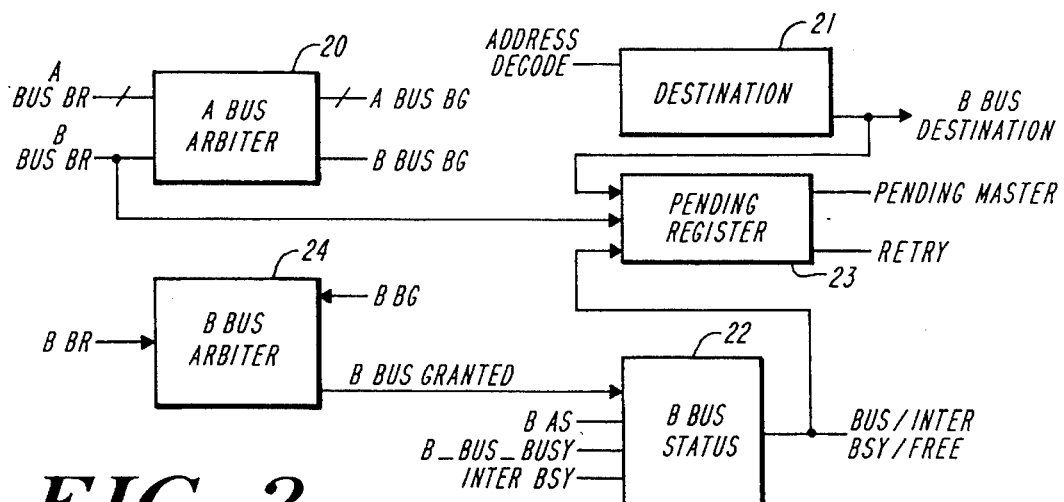
FIG. 2 shows a block diagram of exemplary signal controls for data transfers between a fast bus and a slow bus.

FIG. 2 shows exemplary signal controls required for data transfers in either direction between a fast operating bus A and a slow operating bus B. Bus arbitration control 20 arbitrates among devices on the A bus which request use of the A bus either for intra-bus transfers via suitable intra-bus request signals (ABUS_BR) or for inter-bus transfers which request use of the A bus for data transfers to or from the B bus (BBUS_BR). The system is granted and the granted master starts its tenure on the A bus. When an A bus requestor (ABUS_BR) requests use of the A bus, the address for the data transfer is decoded to determine whether the request has a destination on the A bus or on the B bus (block 21). If the request is a B bus request, the status of the B bus is checked (block 22) and, if the B bus is busy, the requestor is placed in a pending status, see block 23 (PENDING MASTER) and its tenure on the A bus is removed (ISSUE RETRY) to be serviced at a later time when the B bus is free, as discussed below. When the requestor has been so marked as "pending", the A bus can in effect ignore the request from such requestor until the B bus is freed up for the pending requested data transfer. When later the B bus is free, the pending master is given priority to be granted the A bus through to the B bus for the transfer.

For such operations, the B bus status, as well as the status of the interface unit are continually monitored (block 22) to determine their busy/free status. A busy status can occur if the B bus has been granted to any requestor on the B bus (block 24), or if another requestor on the B bus is currently maintaining tenure on the B bus (B_BUS_BUSY). A busy status can also occur if the interface unit is busy (INTER_BSY), the latter condition occurring, for example, if the address and data registers on the interface unit, as discussed below, are full.

Figure 3:
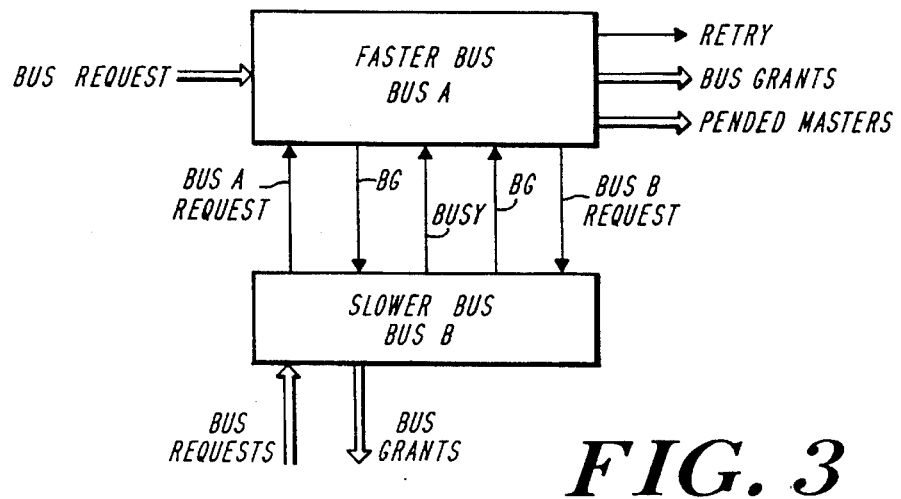
FIG. 3 shows diagrammatically the control signals used for determining data flow in either direction between the buses.
Figure 10A:
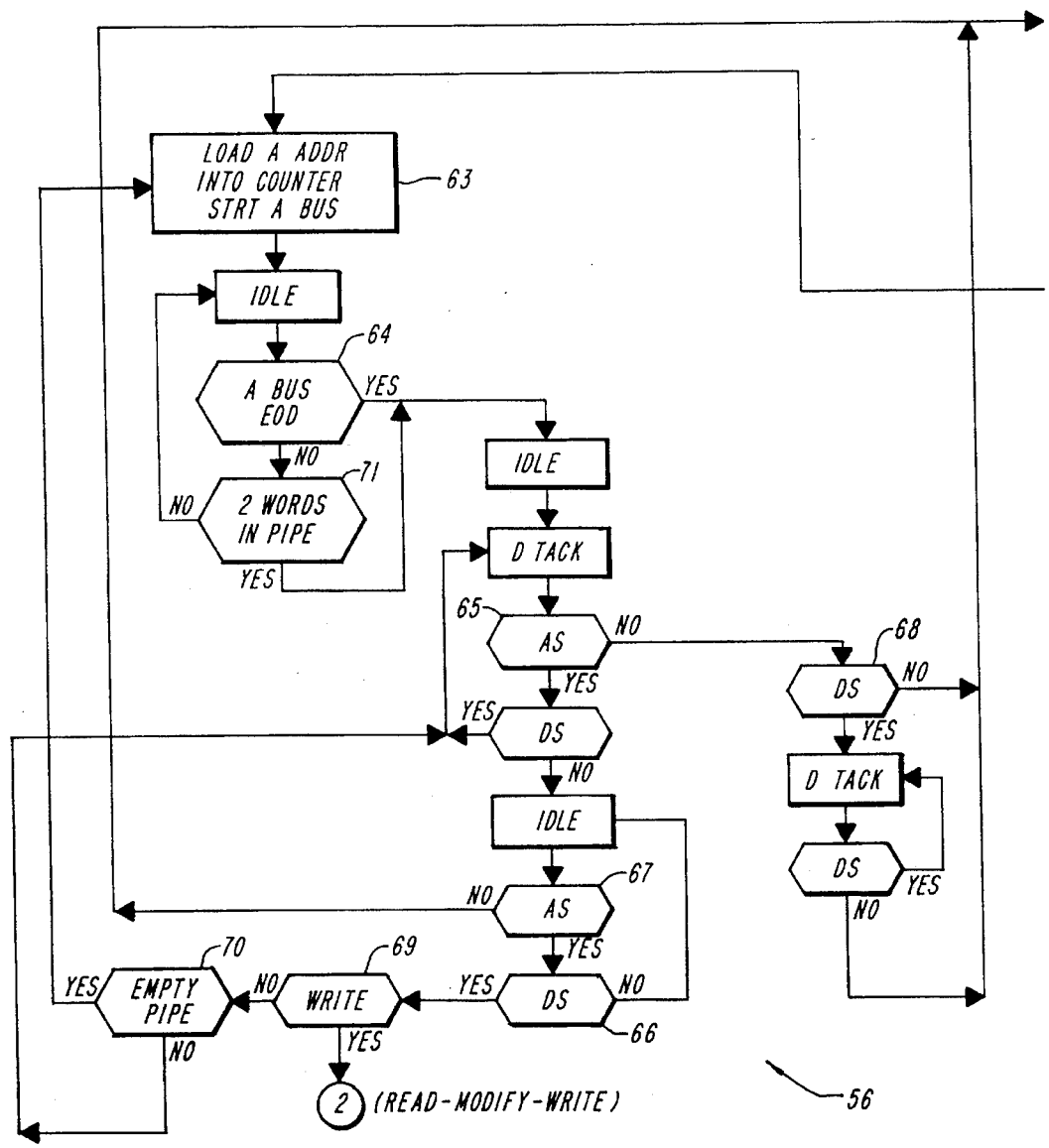
FIG. 10A, 10B and 11 show flow charts of address and data flows through the interface unit of FIG. 9.
Figure 10B:
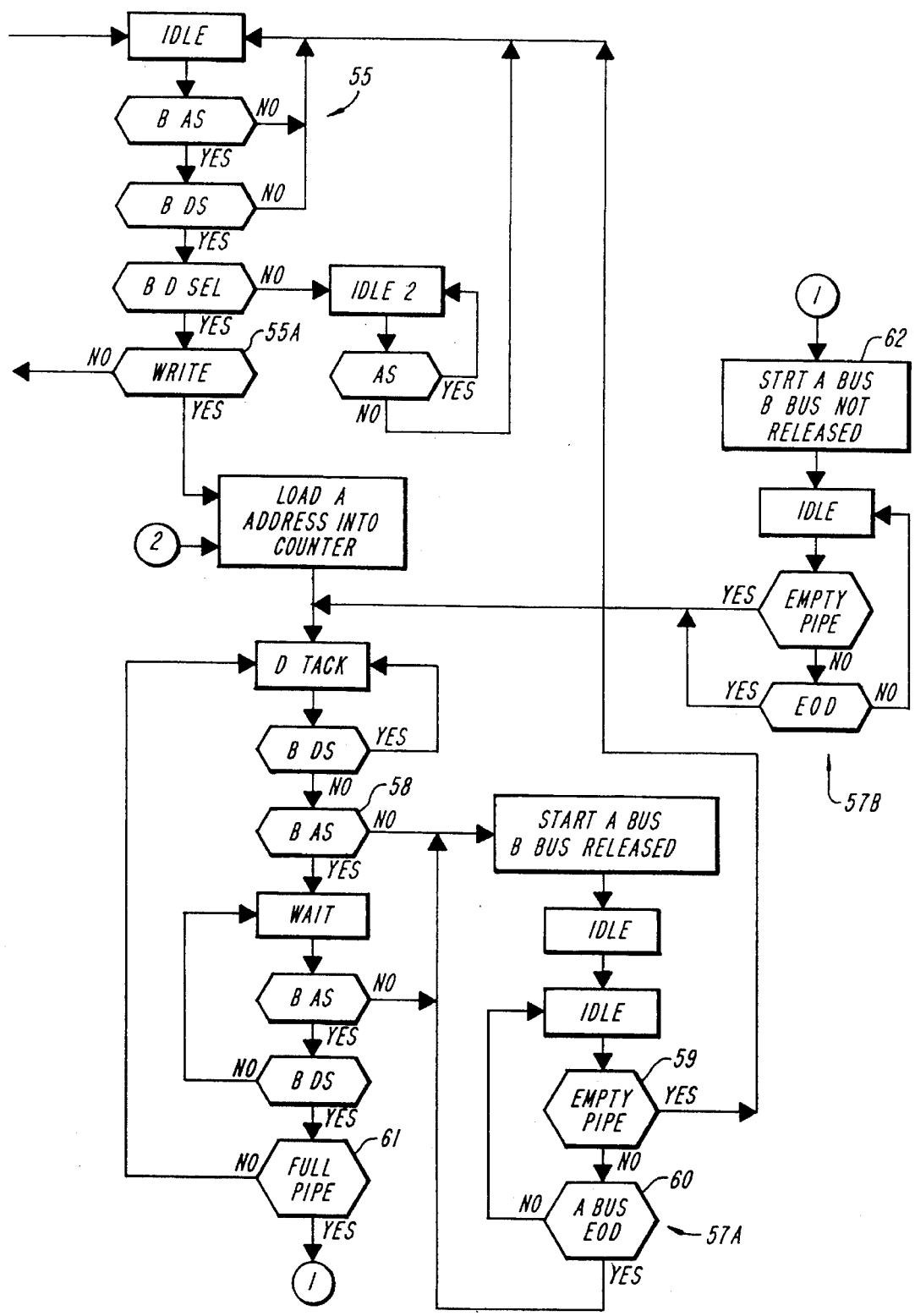
Figure 11:
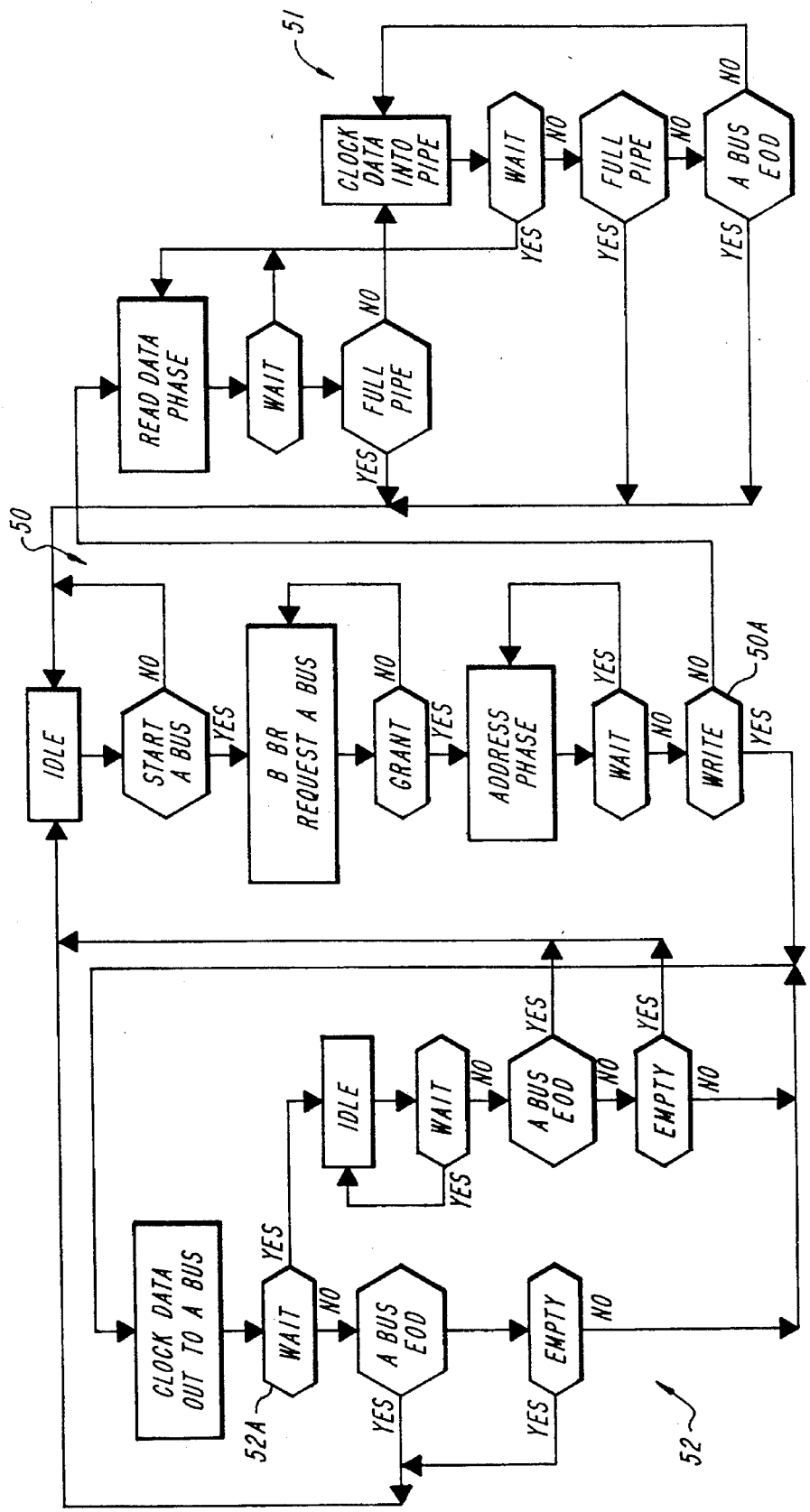

FIG. 3 shows a diagrammatic presentation of the control signals used for determining data flow in either direction between the buses, while more specific flow charts showing operations which determine the use of the buses are shown in FIGS. 4–8, as discussed below. The interface unit is shown in block diagram form in FIG. 9 and the address and data flows through the interface unit for both read and write requests in either direction are shown in FIGS. 10A, 10B and 11.

As can be seen in FIG. 3, bus requests by devices on the slower bus B for use of the faster bus A either result in a bus grant or not depending on whether the A bus is busy or not. If the A bus is busy, no transfer can occur and the B bus requestor must wait until the A bus is free. If the A bus is not busy, an A bus grant is provided and transfer takes place on the A bus at the faster bus speed of the A bus.

Bus requests by devices on the A bus for use of the B bus depend on whether the B bus is busy or not. If the B bus is busy, however, the A bus is not held in an idle or wait state while waiting for the B bus to be free. Instead, the requestor is marked as being in a "pending" status and the requestor is in effect removed from its tenure on the A bus and the A bus is then free to handle other requests. The pending request for the use of the B bus request can be ignored until the B bus is free. In this manner, unlike requests by B bus requestors for use of the A bus wherein the B bus may remain idle until the A bus is free, the A bus is never placed in an idle state because of inter-bus transfer requests by A bus requestors, but remains available for use by other A bus devices at least for intra-bus transfers.

Figure 5:
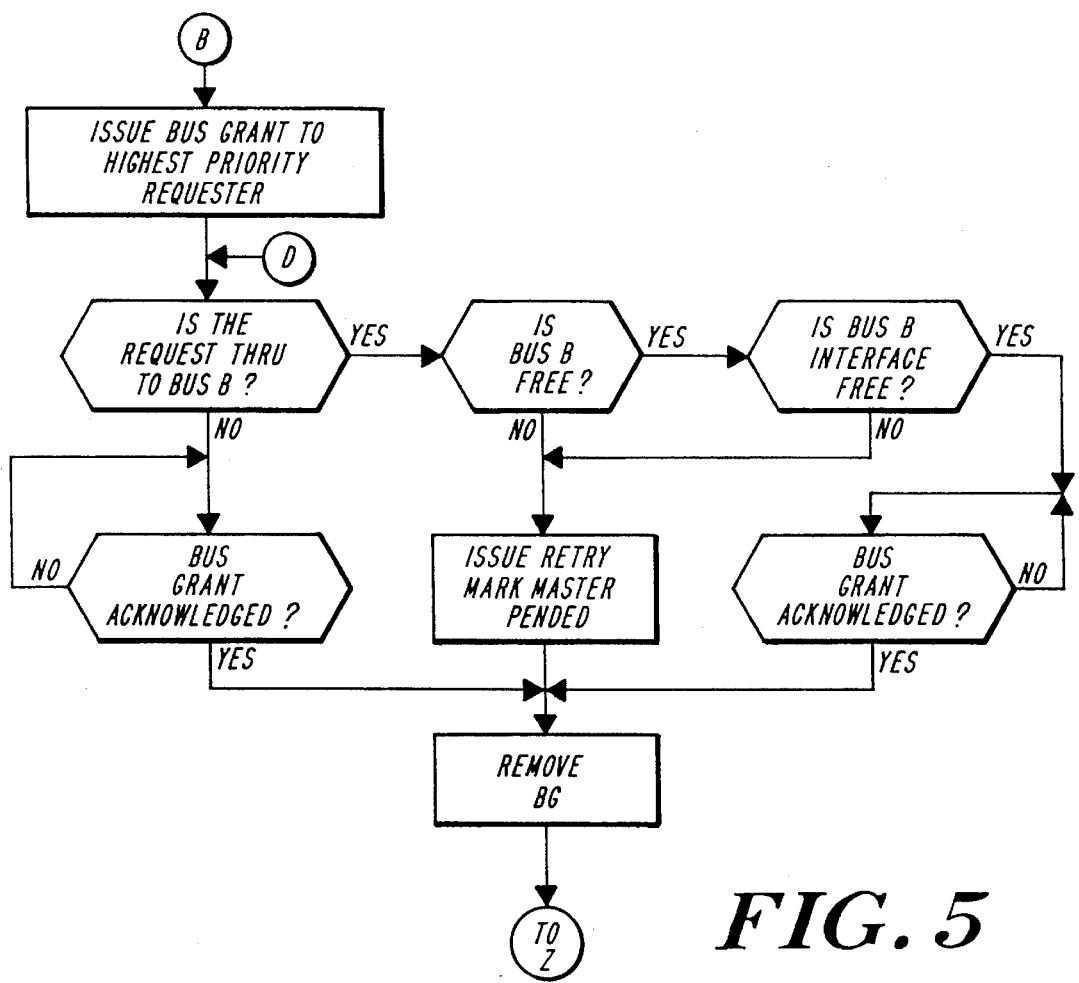
Figure 6:
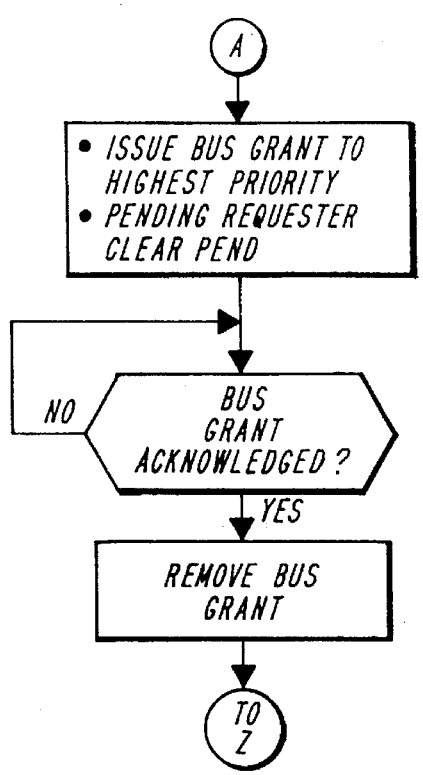
Figure 8:
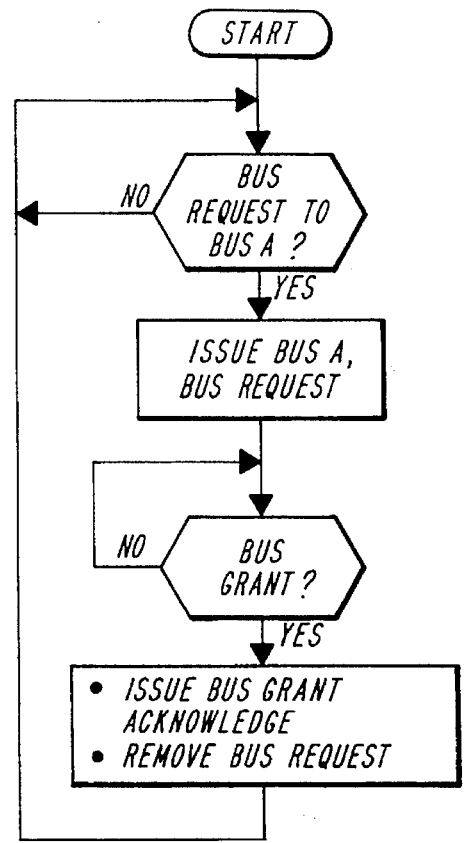
Figure 7:
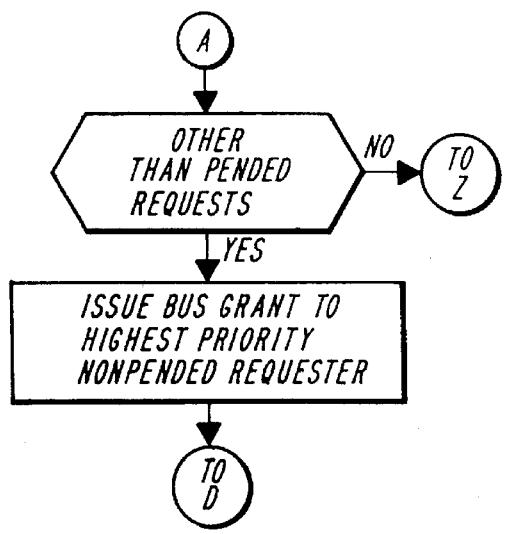

FIGS. 4–8 illustrate more specifically flow charts depicting the control operations required for handling A bus requests for the B bus while FIG. 7 illustrates a flow chart depicting the control operations required for handling B bus requests for the A bus.

Figure 4:
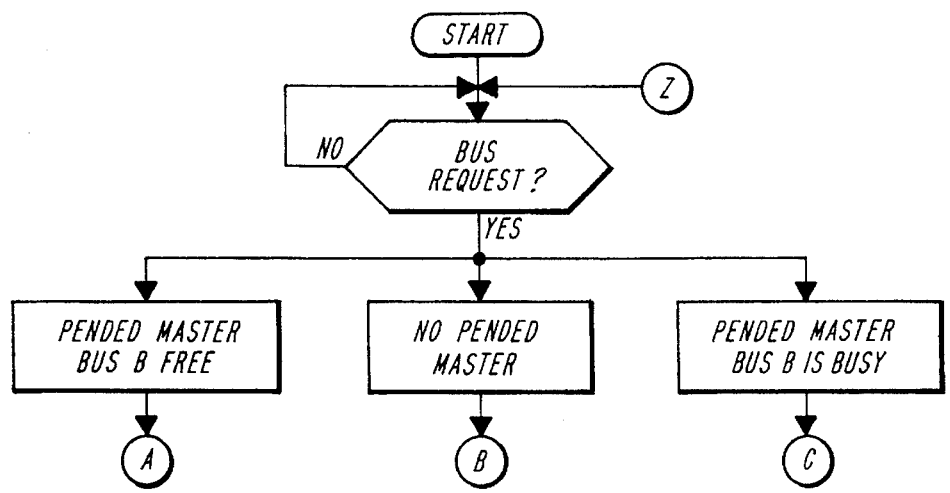
FIGS. 4, 5, 6, 7 and 8 show specific flow charts which depict the address and data flows between the buses for various bus conditions.

As can be seen in FIG. 4, an A bus request for use of the B bus can encounter one of three conditions: (1) there is no pended A bus requestor that has previously requested use of the B bus; (2) there is a pended A bus requestor that has requested use of the B bus and the B bus is now free; or (3) there is a pended A bus requestor that has requested use of the B bus but the B bus is busy.

FIG. 5 illustrates control operations for the first condition in which the A bus identifies the current A bus requestor having the highest priority (if more than one such request is currently occurring) and grants the use of the A bus to that highest priority requesting master. A determination is then made as to whether that master requires use of the A bus only for an intra-bus transfer or whether the master requires use also of the B bus for an inter-bus transfer. If the master requires use only of the A bus, the arbiter waits for the grant to be acknowledged by the requestor, the grant thereupon being removed and the requestor uses the A bus as desired. At that stage, any subsequent request for the A bus can then again be considered as shown in FIG. 3 (To Z).

On the other hand, if the request by a device on the A bus is for a data transfer to the B bus, a determination must then be made as to whether the B bus is busy or is free. If the B bus is busy, the master is marked as a pending B bus requestor (PENDING MASTER) and its tenure is then removed from the A bus (ISSUE RETRY). Any other request for use of the A bus can then be considered while such master remains in a pending state.

If, on the other hand, the B bus is free but the interface unit is busy, the master must also be marked as pending and its tenure removed from the A bus as before. If both the B bus and the interface unit are free, however, use of the B bus can be granted to the master, the grant being then removed when the master acknowledges the grant.

FIG. 6 illustrates the second condition wherein there is one, or more, pended requestors on the A bus and the B bus is free. A determination is made as to which pending requestor has the highest priority. The pending status of that highest priority requestor is cleared and use of the A bus and of the free B bus is granted to the highest priority requestor. The highest priority requestor then acknowledges the grant and begins its tenure on the A bus through to its destination on the B bus.

FIG. 7 illustrates the third condition wherein there is currently one, or more, pended master and the B bus is still busy. A determination is made as to whether there are any non-pending requestors, i.e. requestors that are not already marked as pended. Any pending B bus requestors can be ignored so long as the B bus is busy. The highest priority non-pending requestor is granted the A bus. If the destination of such requestor is decoded to be the B bus, this master is also marked as pended and the process described for handling such requests proceeds as in FIG. 5 (To D).

Requests for use of the higher speed A bus by the lower speed B bus are less complicated since there is not the need to prevent the slower B bus from being idle as there is with the faster A bus. The handling of such requests is shown by the flow chart of FIG. 8. If there is a request by a device on the B bus, a determination is made as to whether such request is also for use of the A bus. If use of the A bus is not requested, the B bus handles the request in accordance with its own bus priority scheme. If the request, however, is also for use of the A bus, an A bus request is issued. If the A bus is busy, no grant of the A bus to such requestor can be made until the A bus is free. Once the A bus is free, it is granted to the requestor on the B bus and the grant is acknowledged and a data transfer can be made. The grant is then removed to await a request from the next B bus requestor. If the B bus request for the use of the A bus is for a write operation, the data to be written, as well as the address thereof, can be placed into registers in the interface unit, as discussed below, and once placed therein, the B bus can be released for other B bus activity. If the request is for a read operation, however, the B bus cannot be so released and remains in a wait status until the data can be read from the device on the A bus and is available on the A bus for transfer to the B bus. After such transfer is made, the B bus can be released and becomes free for use by other B bus requestors.

Figure 9:
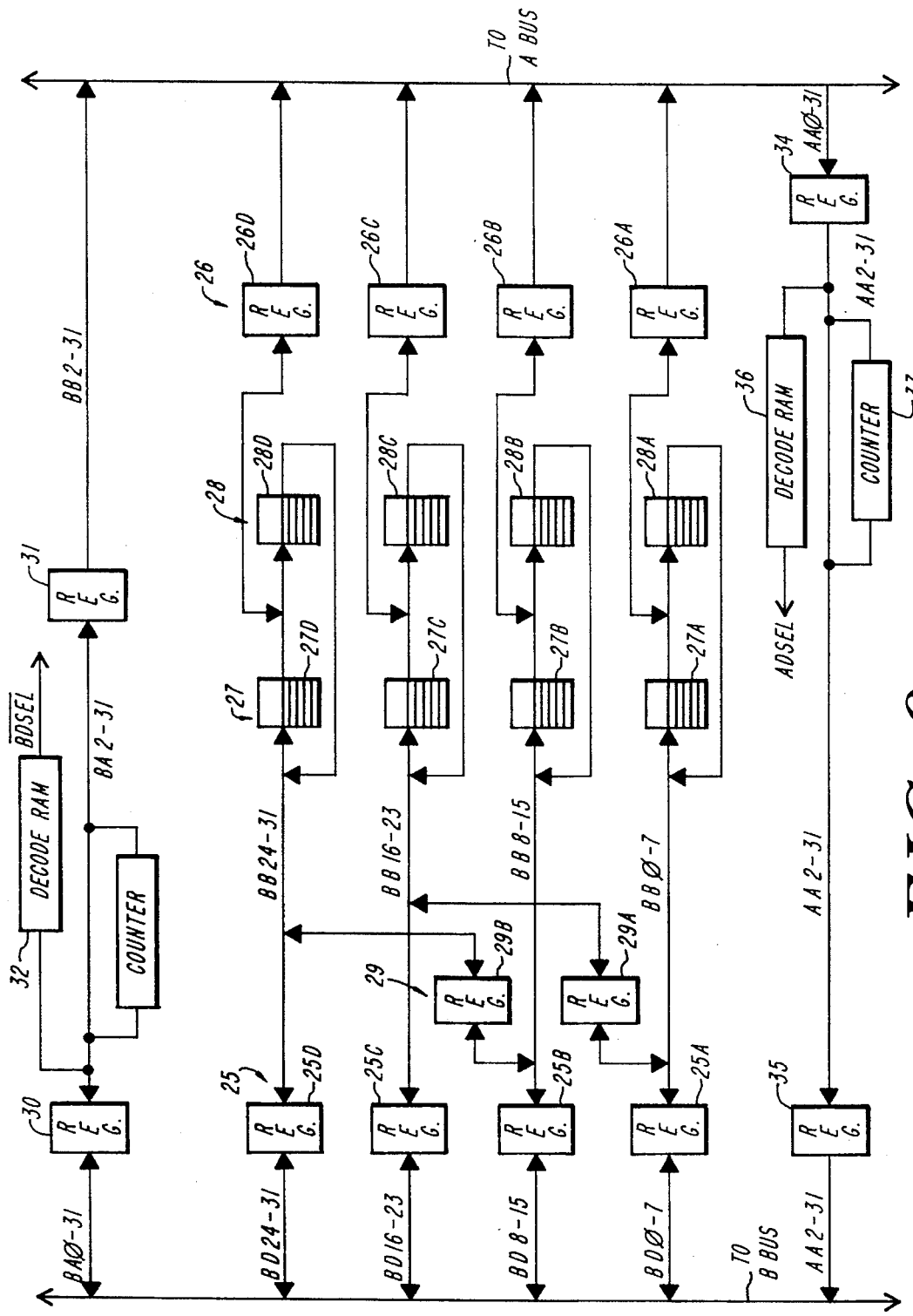
FIG. 9 shows a block diagram of the interface used between the buses.

A block diagram of the interface unit for providing data transfers between the buses is shown in FIG. 9 wherein registers 25 communicate with the B bus, registers 26 communicate with the A bus and communication between registers 25 and 26 occurs via FIFO (first in-first out) units 27 (for data being transferred from the B bus to the A bus and) and 28 (for data being transferred from the A bus to the B bus). Each register handles one byte (8 bits) of a full 32-bit data word so that four register units handle an entire 32 bit word. Each FIFO unit handles a byte of each of a plurality of data words so that four FIFO units handle four full 32 bit words. Normally in a preferred embodiment, all four bytes of an entire 32 bit word are available to the A bus at registers 26 for a simultaneous parallel transfer to the A bus, even though some devices on the B bus may not be able to transfer all four bytes of a 32 bit word simultaneously. For example, a device on the B bus may be able to transfer only two bytes at a time. For such device, registers 25 are used at the B bus side of the interface unit so that two bytes are first transferred directly into registers 25A and 25B to FIFO units 27C and 27D via registers 29A and 29B where they remain stored until the next two bytes are supplied via registers 25A and 25B directly to FIFO units 27A and 27B. All four bytes can then be transferred from FIFO units 27 to registers 26 for subsequent transfer simultaneously to the A bus. For devices on the B bus which transfer only one byte at a time, a first byte is supplied to register 25B and thence to FIFO 27D via register 29B and a second byte to register 25A and thence to FIFO 27C via register 29A. A third byte is supplied to register 25B and thence directly to FIFO 27B and a fourth byte to register 25A and thence directly to FIFO 27A. Four 32 bit words can thereby be supplied to FIFO's 27 and such four data words can then be supplied to registers 26 for subsequent transfer to the A bus for writing data from the B bus to the A bus.

Similarly, for read transfers, i.e., for reading data from the A bus to the B bus devices, four bytes can be received simultaneously from the A bus at registers 26 and thereupon supplied to FIFO units 28, and thence to registers 25 to be driven on to the B bus. In transferring two bytes at a time to the B bus, the first two bytes are transferred from FIFO units 28C and 28D to registers 25A and 25B via registers 29A and 29B while the second two bytes from FIFO units 28A and 28B are subsequently transferred directly to registers 25A and 25B for transfer to the B bus. Single byte transfers can also occur in a manner analogous to that described above.

Addresses are transferred from the B bus to the A bus via address registers 30 and 31. The address from the B bus is monitored at decode RAM 32 to identify whether the address is one intended to access an A bus device for either a read therefrom or a write thereto. The specific device is identified by the address bits B ADD 2–31. A counter 33 is used to track the starting address of various data word groups as they are transferred.

Similar address transfer logic is used for address transfers from the A bus to the B bus as shown by registers 34 and 35, decode RAM 36 and counter 37.

FIGS. 10A and 10B, which can be placed side by side, show flow charts depicting address and data flows for data in the FIFOs with respect to transfers between the B bus and the interface unit both for the reading of data from a device on the A bus to the B bus and for the writing of data from the B bus to a device on the A bus. FIG. 11 shows a flow chart depicting the address and data flows for data in the FIFO's with respect to transfers between the A bus and the interface unit either for reading data from a device on the A bus to the B bus or for writing data from the B bus to a device on the A bus.

With reference to FIGS. 10A and 10B, the flow 55 at the top of FIG. 10B is common to both a read operation shown by the flows 56 in FIG. 10A (where data which has been read from a device on the A bus is to be supplied to the B bus from the interface unit), and a write operation, shown by flows 57A or 57B in FIG. 10B (where data from a B bus device is supplied to the interface unit to be written into a device on the A bus). In the figures "AS" represents an address strobe, "DS" represents a data strobe, "BDSEL" identifies whether an address is intended for an A bus device (as discussed below with respect to FIG. 11), "DTACK" represents a data acknowledge, and "EOD", as discussed above, represents a end-of-data condition. Initially when AS and DS are present, a determination is made as to whether a write or read operation is required (block 55A).

For a write operation the address of the A bus device into which the data is to be written is loaded into a suitable counter to keep track of the block of data which is being transferred. DTACK acknowleges the data and the data to be written into the A bus device is clocked into the appropriate interface unit FIFOs. When the address strobe is no longer present (block 58) it signifies that no more data is going to be sent from the B bus device for entry into the FIFOs and the data which is then clocked can be used for the desired A bus transfer (see the START A BUS flows in FIG. 10) and the B bus can be released. When the FIFOs are emptied (block 59) or when no further data can be accepted by the A bus even though the FIFOs may not be emptied (block 60), the write operation is completed.

So long as data is still being supplied from the B bus and the address strobe is present, however, the data is supplied to the FIFOs until they are full (block 61) at which time the A bus can be started, although the B bus cannot be released because more data is still to be sent (block 62).

For a read operation with respect to data transfers from the interface unit to the B bus, the address of the A bus device from which the data has been read is loaded into a suitable counter to keep track of the data word blocks involved (block 63, FIG. 10A) and the A bus can be started immediately. When no more data is to be sent (block 64) data which has been read is acknowledged and placed on the B bus (DTACK). So long the address strobe is present (block 65) the data is clocked onto the B bus until the data strobe is no longer present (block 66) and the address strobe is no longer present (block 67) indicating that no more data is left to be placed on the B bus and the read operation is completed.

If data is acknowledged and placed on the B bus and the address strobe is no longer present (block 65) the data is clocked onto the B bus until the data strobe is no longer present (block 68) at which time the read operation is completed.

So long as the address strobe and data strobe are present indicating more data is to be sent (block 65 and 67) and no read-modify-write operation is required (block 69) the data is clocked onto the A bus until the FIFOs are empty (block 70) in which case the process starts again until no more data is left to be supplied to the B bus (the FIFOs are again filled for such purpose).

Further in a specific implementation it may be desirable that a data transfer be started on the B bus when only two data words of a block are present in the FIFOs (block 71) rather than waiting until all four data words of a block are so present.

As can be seen in FIG. 11, the flow designated at 50 in the central part of the figure is common to both a read operation (designated by the flow 51 at the right of the figure) or a write operation (designated by the flow 52 at the left of the figure). Once the B bus has been granted a request for the A bus, it must be determined (block 50A) whether the request is for a write (where data from the B bus will be supplied by the interface unit to the A bus for writing into an A bus device) or for a read (where data which is read from a device on the A bus will be supplied to the interface unit for the B bus).

In a write operation (flows 52) data can be clocked out to the A bus from the FIFO's 28 and a determination is made as to whether a wait is required (block 52A). For either a wait or a non-wait condition, once data is clocked, the data is supplied to the A bus until no more data can be accepted (an end-of-data, EOD, condition) or until no more data remains in the FIFOs (EMPTY), at which time the write is completed.

In a read operation (flows 51) the data is read until the FIFOs are full (FULL PIPE), the data being clocked into the FIFOs so long as the pipe is not full or until all the data has been read (and end-of-data condition) even when the pipe is not full.

What is claimed is:

1. In a data processing system requiring data transfers between two independently, asynchronously operating buses which are interconnected via an interface unit wherein one bus operates at a higher speed and the other bus operates at a lower speed, a method for controlling inter-bus data transfers comprising the steps of:

determining when a requesting device on the high speed bus has tenure on the higher speed bus and requests access to permit data transfers to or from the lower speed bus;

determining the busy status of the lower speed bus;

placing the requesting device in a pending status when the lower speed bus is busy and removing the tenure of the requesting device from the higher speed bus; and providing access by the higher speed bus to the lower speed bus via said interface unit when the lower speed bus is not busy.

2. A method in accordance with claim 1 and further including the steps of:

removing the pending status of a requesting device which was placed therein when the lower speed bus was busy; and providing access to the lower speed bus to said requesting device on a priority basis when said pending status has been removed and the lower speed bus is no longer busy.

3. A method in accordance with claim 1 and further including the step of:

determining which of the following conditions is present when a device on the higher speed bus requests access to the lower speed bus:

(1) there is no pending requestor on the higher speed bus, (2) there is a pending requestor on the higher speed bus that has requested use of the lower speed bus and the lower speed bus is not busy, (3) there is a pending requestor on the higher speed bus that has requested use of the lower speed bus but the lower speed bus is busy.

4. A method in accordance with claim 3 and further including the following steps when condition (1) is present:

identifying a current non-pending requestor on the high speed bus which has the highest priority;

providing access to the higher speed bus to the identified highest priority requestor;

determining whether the requestor requires use of the higher speed bus only or requires use of both the higher speed bus and the lower speed bus;

providing access to the higher speed bus when the requestor only requests access to the higher speed bus;

determining the busy status of the lower speed bus when the requestor requests access to both the higher speed bus and the lower speed bus;

marking the requestor as a pending requestor when the lower speed bus is busy and removing the tenure of the requestor from the higher speed bus; and providing access to the higher speed bus and the lower speed bus by the requestor when the lower speed bus is not busy.

5. A method in accordance with claim 3 and further including the following steps when condition (2) is present:

determining which pending requestor has the highest priority;

providing access to the higher speed bus through to the lower speed bus to the highest priority pending requestor.

6. A method in accordance with claim 3 and further including the following steps when condition (3) is present:
   determining whether there are any non-pending requestors;
   determining the highest priority of the non-pending requestors;
   providing access to the higher speed bus to the highest priority non-pending requestor;
   determining whether the highest priority non-pending requestor is requesting use of the lower speed bus; and
   placing said highest priority non-pending requestor in a pending status if such requestor is requesting use of the lower speed bus.

* * * * *